UNITED STATES PATENT OFFICE 2,337,693

SALTS OF SULPHAMIC ACIDS

Philip F. Tryon, Terre Haute, Ind., assignor to Commercial Solvents Corporation, Terre Haute, Ind., a corporation of Maryland No Drawing. Application May 12, 1941, Serial No. 393,123

3 Claims. (Cl. 260—584)

The present invention relates to new and useful compositions of matter. More particularly, it relates to salts of sulphamic acid having the following structural formula:

$RNH_3OSO_2NH_2$ wherein R represents hydroxyl, polyhydroxyalkyl, or a monohydroxyalkyl group having in excess of two carbon atoms.

As examples of the sulphamic salts which are included by the above generic formula, there may be mentioned hydroxylammonium sulphamate, 1-hydroxy-2-methyl-2-propaneammonium sulphamate, glucoseamine sulphamate, 1,3-dihydroxy-2-methyl-2-propaneammonium sulphamate, tris-(hydroxymethyl)methyl ammonium sulphamate, 3-hydroxy-2-methyl-2-hexaneammonium sulphamate, and the like.

The compounds of the present invention may be prepared in accordance with any suitable procedure. For example, they may be conveniently synthesized by reacting an equivalent of sulphamic acid with an equivalent of the desired aminohydroxy compound, in the presence or absence of a suitable solvent, such as water; the use of said solvent, of course, being entirely dependent upon the particular aminohydroxy compound employed. In the case of the aminohydroxy compounds which are solids under ordinary conditions and melt at a temperature not appreciably in excess of 100° C., no solvent need be employed, reaction between sulphamic acid and the aminohydroxy compound being readily effected by heating said aminohydroxy compound to its melting point, and the sulphamic acid then slowly added thereto in powdered form with thorough agitation. If, however, it is desired to prepare the sulphamic acid salts of aminohydroxy compounds melting substantially above 100° C., a suitable solvent should be employed in order that the reaction may be carried out at a temperature sufficiently low to avoid the possible occurrence of side reactions.

The sulphamic acid employed in the preparation of the compounds of the present invention, may be suitably produced in accordance with any of several methods. A satisfactory procedure, for example, by which this material may be manufactured on a large scale, has recently been developed, and is disclosed in U. S. Patent No. 2,102,350. According to the method there described, urea is reacted with fuming sulphuric acid, as may be represented by the following equation:

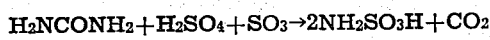
$H_2NCONH_2 + H_2SO_4 + SO_3 \rightarrow 2NH_2SO_3H + CO_2$

In this process, urea is first dissolved in excess cold sulphuric acid, to which fuming sulphuric acid of suitable sulphur trioxide content, is then added, and the reaction allowed to proceed under suitably controlled conditions. During the reaction, carbon dioxide is generated, and the sulphamic acid formed precipitates from the solution. The product is isolated by filtration, and purified by recrystallization from water.

As will be apparent from the above disclosure, there are numerous aminohydroxy compounds which are capable of forming salts with sulphamic acids. It will likewise be evident that such materials are capable of synthesis by means of various procedures. For example, one particular class of aminohydroxy compounds, which may be employed in the preparation of the sulphamic acid salts of the present invention, may be conveniently synthesized through the catalytic reduction of the corresponding nitrohydroxy compound. Such a procedure is described in detail in U. S. Patent No. 2,157,391. In accordance with this procedure, the nitrohydroxy compound in question, is dissolved in a suitable solvent, such as a lower aliphatic alcohol, and placed in a hydrogenation apparatus of conventional design, and subjected to hydrogenation in the presence of a nickel catalyst and carbon dioxide, the latter being preferably added in the solid state. In carrying out this reduction step, the combined pressures of carbon dioxide and hydrogen may be varied from atmospheric pressure to pressures in excess of 2000 pounds per square inch, but for optimum results they should generally be maintained within a range of from 300 to 1000 pounds per square inch. The reaction temperature in general is preferably maintained at a value of from 50° to 60° C. This condition, of course, will vary, depending upon the particular nitrohydroxy compound being hydrogenated, and also upon the pressure employed.

The following examples will illustrate my invention, but it is to be distinctly understood that said examples in no way limit the scope thereof:

Example I

To 45 parts of 2-amino-2-methyl-1-propanol was slowly added, with thorough agitation, 48 parts of powdered sulphamic acid. During the addition of the acid, the temperature of the mixture rose to approximately 60° C. After completion of the addition of the sulphamic acid, agitation of the mixture was continued until the reaction appeared to be complete, as evidenced by a decrease in temperature of the reaction medium. The 1-hydroxy-2-methyl-2-propaneammonium sulphamate thus obtained was a heavy red viscous oil having a nitrogen content of 14.9 per cent, as compared to 15.1 per cent for theory.

Example II

A solution of 160 parts of barium hydroxide octahydrate in approximately 600 parts of water, was slowly added, with stirring, to a solution consisting of 82 parts of hydroxylammonium sulphate, and 97 parts of sulphamic acid in 300 parts of water. The resulting mixture was then heated at a temperature of about 50° C., for a period of approximately one-half hour, after which the resulting barium sulphate was removed therefrom by means of filtration. The aqueous filtrate was then concentrated under vacuum, at a temperature of approximately 65° C., until the total weight thereof amounted to 135 parts, after which approximately 225 parts of methanol was added thereto. Upon cooling this mixture to a temperature of 5° C., colorless crystals of hydroxylammonium sulphamate were observed to separate. These crystals were then removed from the mother liquor by filtration, and dried over phosphorus pentoxide. The quantity of hydroxylammonium sulphamate thus recovered, amounted to 78 parts. The product, prepared as described above, after dissolving in water and precipitating with ethanol, melted at 86–88° C., and contained 21.7 per cent nitrogen, as compared to 21.6 per cent for the theoretical nitrogen content. This product was found to be very hygroscopic, and is soluble in water, moderately soluble in methanol, but is insoluble in absolute alcohol, ether, and benzene.

Example III

A mixture consisting of 26 parts of 2-amino-2-methyl-1,3-propanediol and 24 parts of sulphamic acid was heated to melting temperature (about 70° C.), and maintained at this temperature level for a period of approximately one-half hour. The product resulting from this reaction, 1,3-dihydroxy-2-methyl-2-propaneammonium sulphamate, was a light yellow extremely viscous oil having a nitrogen content of 13.7 per cent, as compared to the theoretical value of 13.9 per cent.

Example IV

A mixture consisting of 48 parts of sulphamic acid and 60 parts of tris(hydroxymethyl)aminomethane was dissolved in 30 parts of water, at about 60° C. and the temperature maintained at this point for approximately one-half hour. Upon cooling to room temperature, colorless crystals of tris(hydroxymethyl)methylammonium sulphamate were observed to separate from the mother liquor. These crystals were filtered by means of suction, and dried over phosphorus pentoxide. The product thus obtained melted at 103.5° C., and amounted to 37 parts. The nitrogen content of the product, prepared as described above, was found to be 13.0 per cent, as compared to 12.8 per cent for theory.

The carbon-containing sulphamic salts of the type described above are in general soluble in water but are insoluble in the lower aliphatic alcohols, ether, benzene, and acetone.

The products of the present invention constitute valuable intermediates for the synthesis of a wide variety of compounds. Also, the sulphamic salts of the present invention having a relatively low carbon-to-nitrogen ratio, may be employed as ingredients in fire-retardant compositions.

My invention now having been described, what I claim is:

1. As a new composition of matter, sulphamic salts having the structural formula:

wherein R represents a polyhydroxyalkyl group.

2. Tris(hydroxymethyl)methylammonium sulphamate.

3. 1,3-dihydroxy-2-methyl-2-propaneammonium sulphamate.

PHILIP F. TRYON.